United States Patent
Zhang et al.

(10) Patent No.: US 7,420,916 B2
(45) Date of Patent: Sep. 2, 2008

(54) FOURIER-TRANSFORM BASED LINEAR EQUALIZATION FOR MIMO CDMA DOWNLINK

(75) Inventors: Jianzhong Zhang, Irving, TX (US); Giridhar Mandyam, Plano, TX (US); Yuanbin Guo, Richardson, TX (US)

(73) Assignee: Nokia Corporation, Espoo (FI)

( * ) Notice: Subject to any disclaimer, the term of this patent is extended or adjusted under 35 U.S.C. 154(b) by 864 days.

(21) Appl. No.: 10/861,288

(22) Filed: Jun. 4, 2004

(65) Prior Publication Data

US 2004/0228392 A1 Nov. 18, 2004

Related U.S. Application Data

(63) Continuation-in-part of application No. 10/436,618, filed on May 13, 2003, now Pat. No. 6,873,596.

(51) Int. Cl.
*H04J 11/00* (2006.01)
(52) U.S. Cl. .................. 370/210; 370/335
(58) Field of Classification Search ............. 370/210, 370/203, 335, 320, 342; 375/147–148, 150, 375/229, 350, 267, 260, 316, 363, 368
See application file for complete search history.

(56) References Cited

U.S. PATENT DOCUMENTS

| | | | |
|---|---|---|---|
| 5,343,496 A | 8/1994 | Honig et al. | 375/1 |
| 5,353,300 A | 10/1994 | Lee et al. | 375/1 |
| 5,623,484 A | 4/1997 | Muszynski | 370/335 |
| 5,831,984 A | 11/1998 | Hottinen | 370/441 |
| 5,872,776 A | 2/1999 | Yang | 370/342 |
| 5,970,060 A | 10/1999 | Baier et al. | 370/342 |
| 6,532,254 B1 | 3/2003 | Jokinen | 375/148 |
| 6,608,859 B2 | 8/2003 | De et al. | 375/147 |
| 2003/0125090 A1 | 7/2003 | Zeira | 455/562 |

OTHER PUBLICATIONS

"Novel Frequency-Domain Equalization Architectures for a Single-Carrier Wireless MIMO System", Xu Zhu et al., IEEE 2002, pp. 874-878.
"Frequency Domain Adaptive Equalization for MIMO Systems", Hai Huyen Dam, et al., IEEE 2003, pp. 443-446.
"Efficient MIMO Equalization for Downlink Multi-Code CDMA: Complexity Optimization and Comparative Study", Yanbin Guo et al., IEEE 2004, pp. 2513-2519.
"Kronecker Products and Matrix Calculus In System Theory", Brewer, John W., IEEE Transactions On Circuits And Systems, vol. CAS 25, No. 9, Sep. 1978, pp. 772-781.
"Downlink Channel Decorrelation In CDMA Systems With Long Codes", Werner, Stefan, et al., IEEE 1999, pp. 1614-1617.

(Continued)

*Primary Examiner*—Tu Nguyen
(74) *Attorney, Agent, or Firm*—Harrington & Smith, PC

(57) ABSTRACT

In the reception of a downlink MIMO CDMA signal, the receiving unit performs a simplified process of linear equalization that eliminates the need for inverting the correlation matrix. The correlation matrix is approximated to a good degree by a circulation matrix that is diagonalized by FFT operations, thus substituting two FFTs and one IFFT having a complexity of $$O(L_F(N\Delta)^3 + \frac{(N\Delta)^2 + 2(N\Delta)}{2} L_F \log_2 L_F)$$

for the direct matrix inversion having a complexity of $O(L_F^3)$.

36 Claims, 6 Drawing Sheets

OTHER PUBLICATIONS

"Low-Complexity Implementation Of CDMA Downlink Equalization", Mailaender, L., IEEE RG Mobile Communication Technologies, Mar. 2001, pp. 396-400.

"Data Detection Algorithms Specially Designed For The Downlink Of CDMA Mobile Radio Systems", Klein, Anja, IEEE, 1997, pp. 203-206.

"MMSE Equalization For Forward Link In 3G CDMA: Symbol-Level Versus Chip-Level", Krauss, Thomas P., et al., IEEE 2000, pp. 18-22.

"A Novel Blind Adaptive Algorithm for Channel Equalization in WCDMA Downlink", Heikkila, Markku J., et al., IEEE 2001, pp. 4-41-4-45.

"Interference Suppression in CDMA Downlink through Adaptive Channel Equalization", Heikkila, Markku J., et al., 5 pages.

"Linear Receivers for the DS-CDMA Downlink Exploiting Orthogonality of Spreading Sequences", Ghauri, Irfan, et al., IEEE 1998, pp. 650-654.

"Fast Positive Definite Linear System Solvers", Tewfik, A. H., IEEE Transactions On Signal Processing, vol. 42, No. 3, Mar. 1994, pp. 572-585.

"Performance Evaluation of the Decorrelating Detector for DS-CDMA Systems over Multi-path Rayleigh Fading Channels with AWGN", Voorman et al., IEEE 1998, pp. 228-232.

"Reduced Linear Decorrelator for Multipath Interference Rejection in CDMA", Lee et al., IEEE 2002, pp. 678-680.

FIG.1

$$d(i) = c(i) \sum_{k=1}^{K} \sum_{m} a_k b_k(m) s_k(i-mG) \quad (1)$$

$$r(i) = H(i)d(i) + n(i) = \begin{bmatrix} h_0 & \cdots & h_L & & \\ & h_0 & & h_L & \\ & & \ddots & & \ddots \\ & & & h_0 & \cdots & h_L \end{bmatrix} \begin{bmatrix} d(i+F) \\ \vdots \\ d(i) \\ \vdots \\ d(i-F-L) \end{bmatrix} + n(i) \quad (2)$$

$$R_{rr}(i) = E[r(i)r^H(i)] = H(i)E[d(i)d^H(i)]H(i)^H + \sigma_n^2 I \quad (3)$$

$$w^{opt} = \sigma_d^2 R_{rr}^{-1} h = (\sigma_d^2 HH^H + \sigma_n^2 I)^{-1} h \quad (4)$$

$$R_{rr} = \begin{bmatrix} r_0 & \cdots & r_L^* & & 0 \\ \vdots & \ddots & & \ddots & \\ r_L & & \ddots & & r_L^* \\ & \ddots & & \ddots & \vdots \\ 0 & & r_L & \cdots & r_0 \end{bmatrix} \quad (5)$$

$$r_l = \sigma_d^2 \sum_{i=0}^{L} h_i h_{i-l} + \delta_l \sigma_n^2, \quad l=0, \ldots, L \quad (6)$$

$$S = R_{rr} + \begin{bmatrix} 0 & 0 & C_L \\ 0 & 0 & 0 \\ C_L^H & 0 & 0 \end{bmatrix} \quad (7)$$

$$C_L = \begin{bmatrix} r_L & \cdots & r_1 \\ & \ddots & \vdots \\ 0 & & r_L \end{bmatrix} \quad (8)$$

FIG.2a
FIG.2b     FIG.2                FIG.2a $$D = \frac{1}{\sqrt{L_F}} \begin{bmatrix} 1 & 1 & \cdots & 1 \\ 1 & e^{-j(2\pi/L_F)} & & e^{-j(2\pi/L_F)(L_F-1)} \\ \vdots & & & \\ 1 & e^{-j(2\pi/L_F)(L_F-1)} & \cdots & e^{-j(2\pi/L_F)(L_F-1)^2} \end{bmatrix} \quad (9)$$

$$V = \begin{bmatrix} 0 & 0 & C_L \\ J_L & 0 & 0 \end{bmatrix} \quad (10)$$

$$R_{rr} = \begin{bmatrix} E_0 & \cdots & E_L^H & & 0 \\ \vdots & \ddots & & \ddots & \\ E_L & & \ddots & & E_L^H \\ & \ddots & & \ddots & \vdots \\ 0 & & E_L & \cdots & E_0 \end{bmatrix} \quad (11)$$

$$E_l = \sigma_d^2 \sum_{i=0}^{L} h_i h_{i-l}^H + \delta_L \sigma_n^2, \quad l=0, \ldots, L \quad (12)$$

$$P = \begin{bmatrix} 0 & 1 \\ 1 & 0 \end{bmatrix} \quad (13)$$

$$S = I \otimes E_0 + P \otimes E_1 + \ldots + P^{L_F-1} \otimes E_{L_F-1} \quad (14)$$

$$S = \underbrace{(D^H \otimes I)}_{15-1} \underbrace{\left( \sum_{i=0}^{L_F-1} W^i \otimes E_i \right)}_{15-2} \underbrace{(D \otimes I)}_{15-3} \quad (15)$$

$$F = \sum_{i=0}^{L_F-1} W^i \otimes E_i = \begin{bmatrix} F_0 & & 0 \\ & \ddots & \\ 0 & & F_{L_F-1} \end{bmatrix} \quad (16)$$

$$F_k = \sum_{i=0}^{L_F-1} W^{-i \cdot k} \otimes E_i, \quad k=0, \ldots, L_F-1 \quad (17)$$

$$S^{-1} = (D^H \otimes I) F^{-1} (D \otimes I) \quad (18)$$

ESTIMATE CORRELATION MATRIX R FROM THE RECEIVED SIGNAL

DO THE FOLLOWING FOR EACH OF THE M TRANSMITTED/RECEIVED SIGNALS:

CONVERT THE BLOCK CIRCULANT MATRIX S BY ADDING THE TWO "CORNERS"

TAKE ELEMENT-WISE FFT ON THE FIRST "BLOCK" COLUMN OF S AND FROM F, INVERT AND GET $F^{-1}$

CALCULATE "DIMENSION-WISE" FFT ON $H_{i;i}$, OF $(D \otimes I)H_{i;i}$ AND FURTHERMORE $F^{-1}(D \otimes I)H_{i;i}$ CALCULATE "DIMENSION-WISE" IFFT OF $F^{-1}(D \otimes I)H_{i;i}$ TO GET THE WEIGHT VECTOR $W = \sigma_d^2 (D^H \otimes I) F^{-1} (D \otimes I) H_{i;i}$ CALCULATE THE ESTIMATED CHIP FROM Eq 2 IN FIG.2

FIG.7

FOURIER-TRANSFORM BASED LINEAR EQUALIZATION FOR MIMO CDMA DOWNLINK

RELATED APPLICATIONS

This application is a Continuation in Part of U.S. Application Ser. No. 10/436,618, filed on May 13, 2003, now U.S. Pat. No. 6,873,596, assigned to the assignee hereof and incorporated herein by reference.

FIELD OF THE INVENTION

The invention relates to a MIMO reception method in mobile CDMA telephone systems wherein a desired signal is separated from other interfering signals by means of a linear equalization algorithm that avoids matrix inversion.

BACKGROUND OF THE INVENTION

A central problem in designing and implementing a data transmission system is simultaneous transmission and reception of signals from several simultaneous users such that the signals interfere with one another as little as possible. Because of this and the transmission capacity used, various transmission protocols and multiple access methods have been used, the most common especially in mobile phone traffic being FDMA (Frequency Division Multiple Access) and TDMA (Time Division Multiple Access), and recently CDMA (Code Division Multiple Access).

CDMA is a multiple access method based on a spread spectrum technique, and it has been recently put into use in cellular radio systems in addition to previously used FDMA and TDMA. CDMA has many advantages over the prior methods, such as simplicity of frequency planning, and spectrum efficiency.

In a CDMA method, a narrow-band data signal of a user is multiplied to a relatively broad band by a spreading code having a much broader band than the data signal. Bandwidths used in known test systems include e.g. 1.25 MHz, 10 MHz and 25 MHz. The multiplication spreads the data signal over the entire band to be used. All the users transmit simultaneously on the same frequency band. A different spreading code is used on each connection between a base station and a mobile station, and the signals of the users can be distinguished from one another in the receivers on the basis of the spreading code of the user. If possible, the spreading codes are selected in such a way that they are mutually orthogonal, i.e. they do not correlate with one another.

Correlators in conventionally implemented CDMA receivers are synchronized with a desired signal, which they recognize on the basis of the spreading code. In the receiver the data signal is restored to the original band by multiplying it by the same spreading code as in the transmission step. Ideally, the signals that have been multiplied by some other spreading code do not correlate and are not restored to the narrow band. In view of the desired signal, they thus appear as noise. The object is to detect the signal of the desired user from among a number of interfering signals. In practice, the spreading codes do correlate to some extent, and the signals of the other users make it more difficult to detect the desired signal by distorting the received signal. This interference caused by the users to one another is called multiple access interference.

The situation is especially problematic when one or several users transmit with a considerably greater signal strength than the other users. These users employing greater signal strength interfere considerably with the connections of the other users. Such a situation is called a near-far problem, and it may occur for example in cellular radio systems when one or several users are situated near the base station and some users are further away, whereupon the users that are situated closer blanket the signals of the other users in the base station receiver, unless the power control algorithms of the system are very fast and efficient.

The reliable reception of signals is problematic especially in asynchronous systems, i.e. systems where the signals of the users are not synchronized with one another, since the symbols of the users are disturbed by the several symbols of the other users. In conventional receivers, filters matched with the spreading codes, and sliding correlators, which are both used as detectors, do not function well in near-far situations, however. Of the known methods the best result is provided by a decorrelating detector, which eliminates multiple access interference from the received signal by multiplying it by the cross-correlation matrix of the spreading codes used. The decorrelating detector is described in greater detail in Lupas, Verdu, 'Linear multiuser detectors for synchronous code-division multiple access channels', IEEE Transactions on Information Theory, Vol. 35, No. 1, pp. 123-136, January 1989; and Lupas, Verdu, 'Near-far resistance of multiuser detectors in asynchronous channels', IEEE Transactions on Communications, Vol. 38, April 1990. These methods, however, also involve many operations, such as matrix inversion operations, that require a high calculating capacity and that are especially demanding when the quality of the transmission channel and the number of the users vary constantly, as for example in cellular radio systems.

Channel equalization is a promising means of improving the downlink receiver performance in a frequency selective CDMA downlink. Current research encompasses two types of linear equalization, namely non-adaptive linear equalization and adaptive linear equalization. Non-adaptive linear equalizers usually assume "piece-wise" stationarity of the channel and design the equalizer according to some optimization criteria such as LMMSE (Least Mininum Mean Squared Error) or zero-forcing, which in general leads to solving a system of linear equations by matrix inversion. This can be computationally expensive, especially when the coherence time of the channel is short and the equalizers have to be updated frequently. On the other hand, adaptive algorithms solve the similar LMMSE or zero-forcing optimization problems by means of stochastic gradient algorithms and avoid direct matrix inversion. Although computationally more manageable, the adaptive algorithms are less robust since their convergence behavior and performance depend on the choices of parameters such as step size.

Multiple transmit, multiple receive systems have been employed in various contexts and it has been shown that in an independent flat-fading environment, the capacity of an MIMO system increases linearly with the number of antennas.

Applying a MIMO configuration to the CDMA downlink presents a significant challenge to the receiver designer because the receiver has to combat both inter-chip interference (ICI) and co-channel interference (CCI) in order to achieve reliable communication.

The art still has need of an equalization procedure that is robust and does not consume a great deal of computation power.

SUMMARY OF THE INVENTION

The purpose of the present invention is to provide an equalization method for downlink MIMO CDMA signals that avoids a computationally intense matrix inversion.

A feature of the invention is a linear filter process using only FFTs and IFFTs as steps in the filter coefficient generation process.

A feature of the invention is the approximation of the correlation matrix with a block circulant matrix that is diagonalized by a DFT operation.

BEST MODE OF CARRYING OUT THE INVENTION

In a preliminary discussion covering both single input/single output (SISO) and multiple input/multiple output (MIMO), consider the case of a CDMA downlink with at least one (M) antenna and J active users each of which is assigned a number of codes Kj; for j=1 - - - J. Let K be the total number of active spreading codes (summed over Kj). Note that in our discussion, we use spreading code index, rather than user index, to simplify the notation. At the transmitter, the chip-level signal representation is given by Eq (1) in FIG. 2, where i, m and k are chip, symbol and spreading code indices. The base station scrambling code is denoted by c(i). Meanwhile, ak stands for the power assigned to spreading code k, bk is the information symbol sequence for spreading code k and sk(i) is the spreading code k.

Let h=[h0; : : : hL] be the composite chip-level channel impulse vector of spreading code k. Note h includes the contributions from transmit pulse shaper, the wireless propagation channel and the receive filter, so that it will change as the environment changes. Also note that since we only consider spreading code k throughout our discussion, we use h instead of hk for clarity. The matrix-vector representation of the received signal is given in equation 2 in FIG. 2. To facilitate the discussion of linear equalization, we stack F+1 chips in the received vector r so that $r(i)=[r(i+F); : : : ; r(i); : : : ; r(i-F)]^T.=H(i)d(i)+n(i)$, where $d(i)=E[d(i)d^H(i)]$ is the transmitted chip power and h(i) is the (F+1)th column in H(i). The solution in this form is not desirable, since it depends on the chip index i and is time-varying. However, the dependence on i can be removed if the following two assumptions hold:

a) The channel vector h(i) is stationary over a block of chips. This condition is satisfied by choosing the block size such that the time span of the block is a small fraction of the channel coherence time. With this condition, the dependence on i is removed from h(i) and H(i).

b) The chip-level transmitted signal d(i) is white and wide sense stationary. It can be shown that this condition is strictly satisfied if the system is fully loaded, i.e, when K=G, and each spreading code is assigned equal power. Otherwise, this condition holds reasonably well except for very lightly loaded systems, i.e, when K<<G. The following solution is thus counterintuitive, since it is better at small signal to noise ratios than when the conditions are conventionally "better"; i.e. a signal stands out cleanly from the background.

Figures 2, 2A:
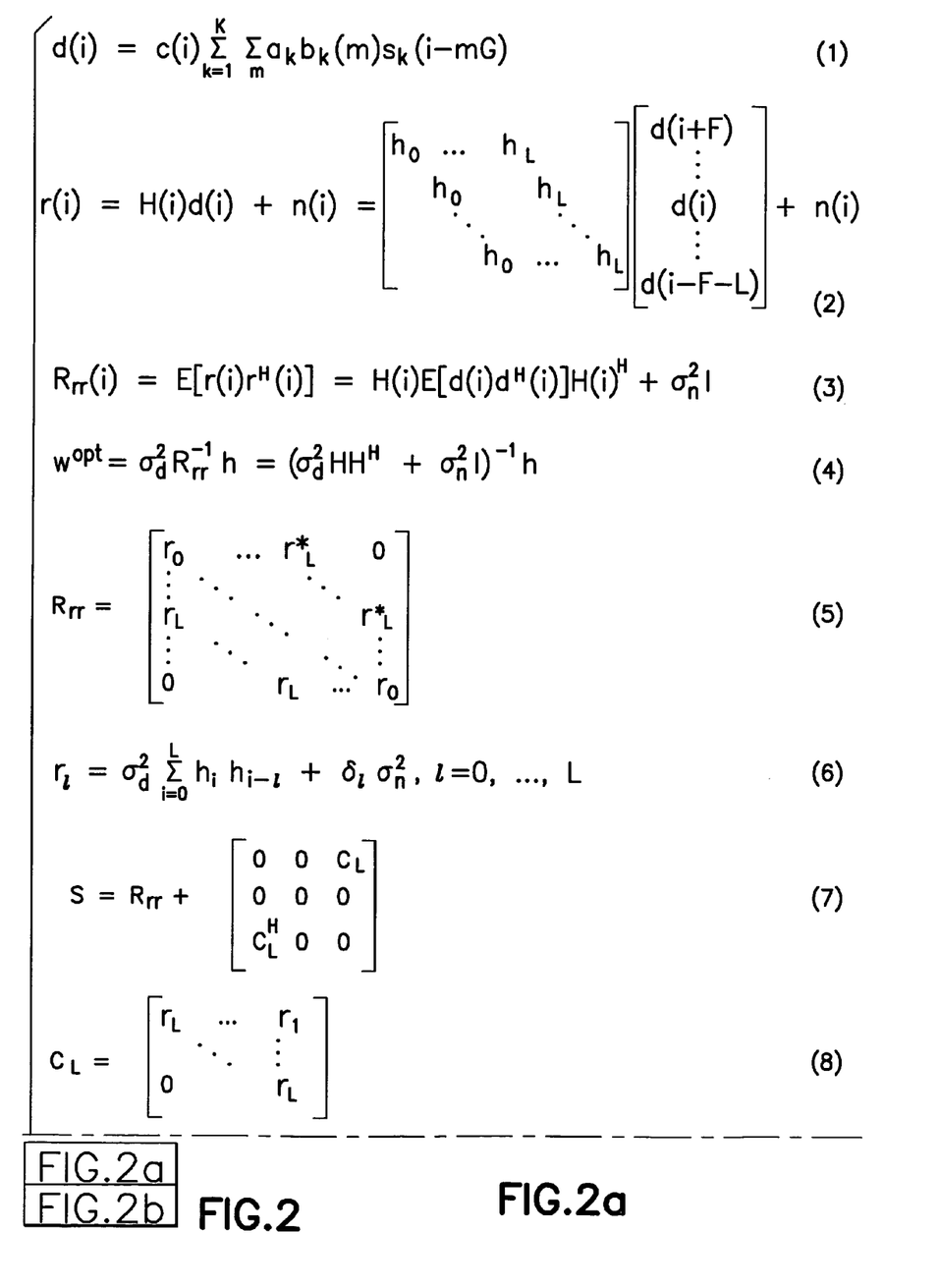
FIG. 2 shows various equations used in the analysis of the invention.
Figure 2B:
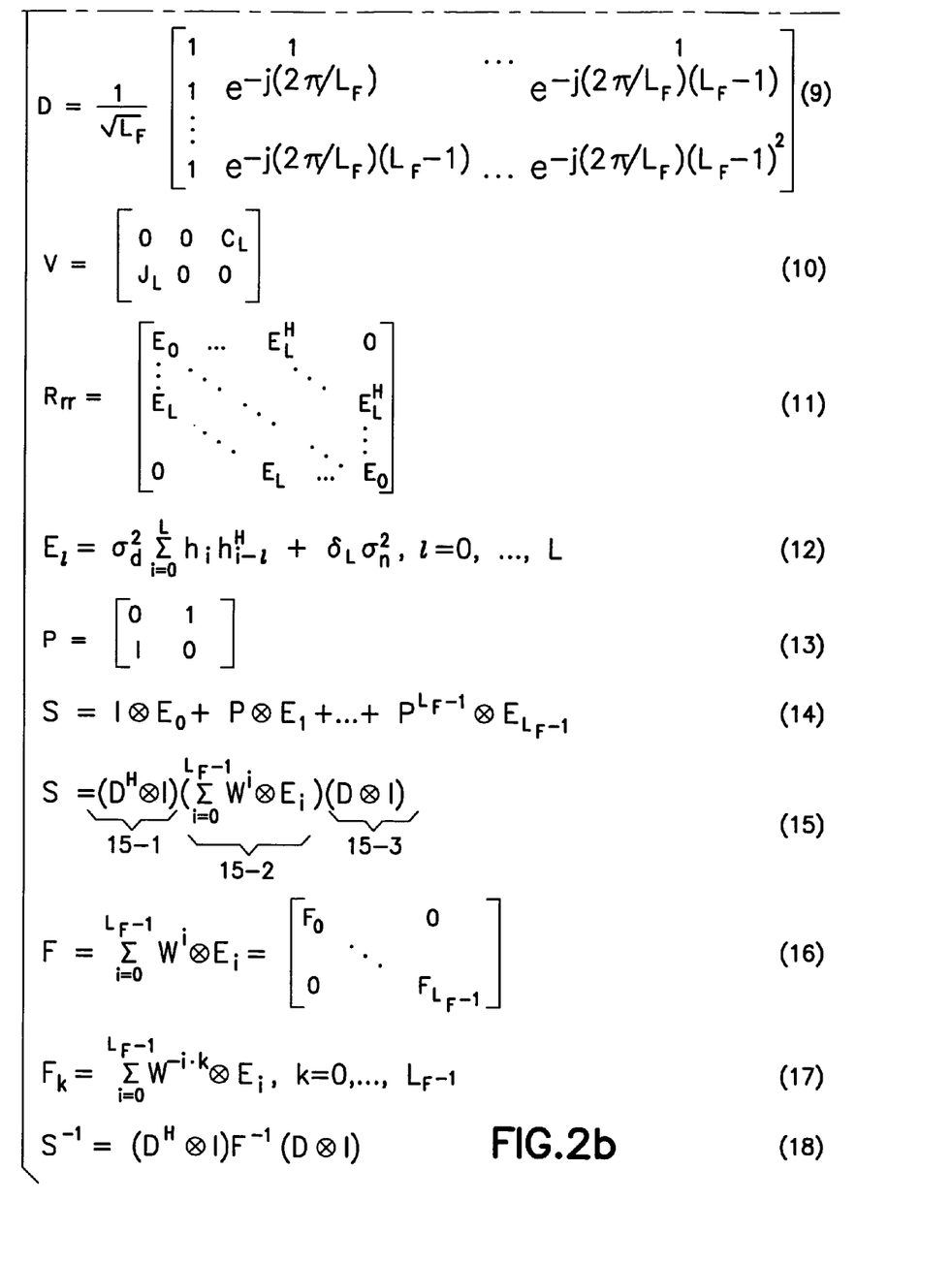

Removing the dependence on time, the solution to the filter vector w becomes Equation 4 in FIG. 2, where sigma is a constant representing the transmitted power, and R is the correlation matrix from Eq 3. Those skilled in the art will be aware that the estimated data after equalization is represented by $d(i)=w^H r(i)$, where r is the received signal in Equation 2 and w is relatively slowly varying. It has been observed that, as shown in Eq 5, that R is banded Toeplitz in form, with individual elements given by Eq 6 that depend on the channel impulse vector h and some constants.

Those skilled in the art are aware that the analytic solution for w to the previous problem (expressing w in terms of other observed parameters) requires inverting the correlation matrix R. The inversion calculation requires computational resources and time. Providing the required computation resources in a mobile telephone handset is difficult, as is performing the calculations with limited hardware resources quickly enough to provide a satisfactory solution. Thus, the invention is well adapted to use in the receiver of a mobile handset in a CDMA cellular system.

The complexity of the matrix inversion is of the order of $L_F^3$, where $L_F=2F+1$ is the filter length. Further, the matrix inversion operation can be numerically unstable and inaccurate in the frequent case of fixed-point implementations.

It is an advantageous feature of the invention that matrix inversion is avoided by a process in which matrix inversion is replaced by Fourier transforms. In the preferred embodiment of the invention, the inversion of the correlation matrix is replaced by two FFTs (Fast Fourier Transform) and an inverse FFT.

If $L_F>2L$, we can convert R into a circulant matrix S by the addition of a matrix C according to Eq 7, where C is an upper triangular "corner" matrix defined in Eq 2. The purpose of this change is to take advantage of the property that every circulant matrix can be diagonalized by a DFT (Discrete Fourier Transform) matrix, i.e. $S=D^H(\Lambda) D$, where D is defined in Eq 9 and $\Lambda$ is a diagonal matrix that is obtained by taking a DFT on the first column of S.

Defining V according to Eq 10, those skilled in the art will appreciate that the problem of inverting the $L_F \times L_F$ matrix R has been reduced to inverting the 2L×2L matrix $J_{2L}-VS^{-1}V^H$, where $J_{2L}$ is a 2L×2L "exchange" matrix (ones on anti-diagonals).

Further, if the filter length is much longer than the channel correlation length, i.e. $L_F>>2L$, then adding the two corners to the correlation matrix R does not significantly change the eigenstructure of the matrix. Accordingly, the inverse of R is approximately equal to the inverse of S. Therefore no direct matrix inversion is necessary since the inverse of S can be obtained with some FFT and IFFT operations.

Returning to the problem of isolating the desired signal, the solution becomes $w=S^{-1}h=D^H(\Lambda)^{-1}Dh$, where the D and $D^H$ operations represent DFT and IDFT operations, respectively. As yet another simplification, the DFT operations can be replaced by computationally simpler FFT operations.

The signal recognition process then becomes:

Estimate the correlation matrix R from the received signal;

Convert R to the circulant matrix S by adding the two corner matrices;

Take FFT(s), where s is the first column of S and generate $\Lambda$;

Calculate Dh=Fft(h) and $(\Lambda)^{-1}$Dh, and

Transform back into the time domain where w=$D^H(\Lambda)^{-1}$Dh=IFFT$((\Lambda)^{-1}$Dh$)$;

Apply the resulting w to the received vector r to calculate the estimated chip d.

The elements of the quantity $(\Lambda)^{-1}$Dh will also be referred to as the frequency domain filter taps. The estimated chip d is then processed conventionally to generate the analog voice signal (or data).

Since the filter is unchanged for a block of N chips, the calculation load per chip is normalized by N. N may be, illustratively, 1024. The overall per-chip complexity then becomes of order $(L_F+(3L_F/2N) \log 2L_F)$, which compares favorably with the complexity of order $(L_F+(1/N)L_F^3)$ for the direct matrix inversion method.

Figure 1:
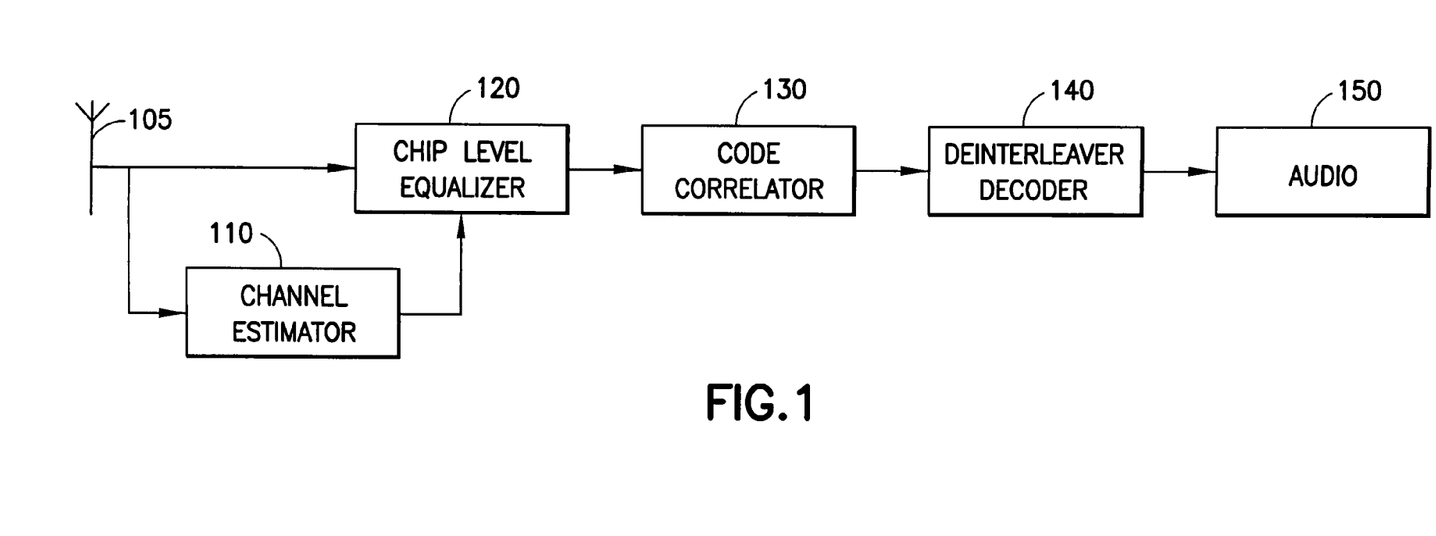
FIG. 1 shows a block diagram of a receiver for the general case.

Referring now to FIG. 1, there is shown a block diagram of a generalized receiver, illustratively a mobile handset in a cellular CDMA system, in which antenna 105 receives incoming signals, which pass to channel estimator 110, which generates an initial estimate for parameters used in the calculations, and also passes to equalizer 120, which represents the circuits that perform the various calculations discussed below. In this algorithm, the process of estimating the correlation matrix elements is performed according to any convenient conventional method such as illustrated in the book "Statistical Signal Processing" by Louis Scharf, Addison Wesley. The calculations may be carried out in a special-purpose device, including a digital signal processor chip and/or a general purpose device such as a microprocessor. The instructions for carrying out the process may be stored in any convenient medium, e.g. a read-only memory chip readable by a machine.

The function of the equalizer is to partially or largely restore the orthogonality of the separate spreading codes representing the various "channels", one for each user.

After the equalizer, a conventional code correlator, as known to those skilled in the art, such as that shown in the book "Digital Communications" by John Proakis, McGraw Hill, [g1]separates out the power associated with the particular code that is carrying the data of interest. A conventional deinterleaver selects the particular data of interest. Box 150, labeled Audio, represents schematically the conventional circuits that convert the digital signals processed up to this point to analog audio, (or in the case of data, pass the data on to the next step). For convenience in expressing the claims, the signal leaving the deinterleaver 140 will be referred to as the output signal and the processes represented by box 150 (summing a block of data, performing digital to analog conversion, smoothing, amplifying, etc.) will be referred to as processing the output signal.

Numerical Calculation Techniques

Two calculation techniques have been found to improve the accuracy of the approximation used and the stability of the results. Adding an artificial noise floor to the matrix S by adding a unit matrix multiplied by a small constant prevents dividing by a small number when the eigenvalues of the matrix are used as divisors in the FFT. This is equivalent to assuming that the noise is worse than it really is.

In addition, since the length of the impulse vector h is a constant fixed by the channel profile, we can improve the accuracy of the approximation by increasing the filter length $L_F$. This has the effect of reducing inaccuracies introduced by adding in the corner matrix CL when the eigenvalues are calculated. Since increasing the filter length means higher filter complexity, a better tradeoff is provided by using a double length ($2L_F$) vector while performing calculations in the frequency domain. The initial set of chips in the received vector is expanded to length $2L_F$. This expanded vector is transformed to the Fourier domain and used for calculations. After the inverse Fourier Transform, the extra $L_F/2$ taps on the two sides are truncated and only the $L_F$ taps in the center are used.

Multi-Channel Diversity

Multi-channel diversity reception is an important means of improving receiver performance. The benefit of diversity reception is two-fold: first, the outage probability is reduced since the chance that all the diversity branches experience deep fade is smaller; second, the added diversity branches provide additional signal dimension that can be used in enhancing the SNR, suppressing the ISI and MAI, etc.

Multi-channel diversity reception manifests itself in many forms. Among them, oversampling, multiple receive antennas, and antenna polarization are the most commonly used.

The performance of these methods critically depend on the statistical correlation between different diversity branches. In general, the smaller the correlation between different diversity branches the better the overall receiver performance.

In this section, we extend our FFT based linear equalization method to single-antenna systems with diversity receptions. The following treatment does not distinguish between different diversity methods since they all share the same mathematical form. To this end, let M denote the total number of diversity branches (typically 2 or 4) and we extend the received signal model of Eq 2 by substituting a small vector $h_i$ for the scalar $h_i$ of the previous discussion.

The correlation matrix is again banded block Toeplitz, with the change that the elements are now small matrices, as shown in eq 11 and 12. The problem of solving the matrix equation for the signal vector w is made more complex because the correlation matrix R is now $ML_F \times ML_F$ and correspondingly more difficult to invert directly.

The procedure of the previous section is followed by approximating the block Toeplitz matrix R with a block circulant matrix S. In order to invert S, we introduce a cyclic shift matrix P according to Eq 13, where I is the identity matrix. S, then, can be represented as Eq 14, where the symbol $\otimes$ denotes a Kronecker product and $E_0$--$E_{LF-1}$ form the first "block" column in matrix S. Proceeding analogously to the previous discussion, P may be diagonalized by a DFT $P=D^HWD$, where D is the DFT matrix and W is diagonal of the form W=diag $(1, W_{LF}^{-1}, \ldots, W_{LF}^{-(LF-1)})$, with $W_{LF}=e^{j(2pi/LF)}$. After some substitution, S may be expressed as Eq 15, where the expression 15-1 denotes dimension-wise IDFT and expression 15-3 denotes dimension-wise DFT, meaning that the DFT or IDFT is applied on each of the M diversity dimensions. The central expression 15-2 is a block diagonal matrix whose diagonal blocks are the element-wise Dft of the array of matrices $E_0, \ldots, E_{LF-1}$, as expressed in eq 16, where F is an M×M matrix defined by eq 17. The inverse of S is therefore given by Eq 18. The inversion of F reduces to the inversion of $L_F$ small M×M matrices, since F is block diagonal.

The procedure for multi-dimensional transmission can be summarized as:

Estimate the correlation matrix R from the received signal.

Convert to the block circulant matrix S by adding two "corners"

3) Take an "element-wise" FFT on the first "block" column of S and form F, invert and get $F^{-1}$ 4) Calculate "dimension-wise" FFT of h, or $(D \otimes I)h$ and $F^{-1}(D \otimes I)h$ 5) Calculate "dimension-wise" IFFT of $F^{-1}(D \otimes I)$ to get the weight vector $w = (D^H \otimes I)F^{-1}(D \otimes I)h$ This algorithm involves one "dimension-wise" FFT and IFFT on a vector of size $ML_F \times 1$ (equivalent to M FFT/IFFTs of length $L_F$), one "element-wise" FFT on a matrix of size $M \times M$ (which is equivalent to $M^2$ FFTs of length $L_F$) and $L_F$ matrix inversions of size $M \times M$. The complexity of this algorithm is of the order $(L_F M^3 + (M^2 + 2M)/2 L_F \log 2L_F)$, compared with the much higher complexity of order $(ML_F)^3$ of a direct matrix inversion of R.

Multiple transmit, multiple receive antenna MIMO systems offer potential for realizing high spectral efficiency of a wireless communications system.

Applying MIMO configuration to the CDMA downlink presents significant challenge to the receiver design, as the receiver has to combat both the inter-chip interference (ICI) and the CCI in order to achieve reliable communication. Those skilled in the art are aware that both the conventional LMMSE algorithm and the Kalman filter algorithm can be extended to the MIMO system. Attempts to combine the non-linear decision feedback interference cancellation with the LMMSE equalization are also found in the literature. However, these algorithms perform the decision feedback directly at the received signal, and thus require the impractical assumption that all the active Walsh codes are known at the mobile receiver in order to reconstruct the transmitted chip sequences.

Figure 3:
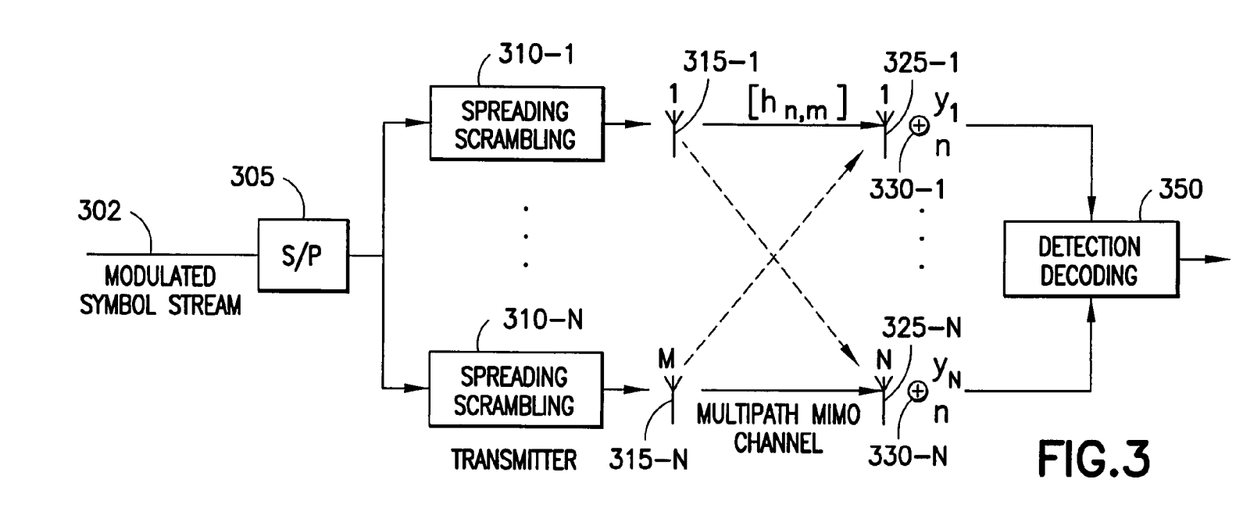
FIG. 3 shows an overall view of a MIMO system according to the invention.

Consider an M transmit antenna, N receive antenna MIMO CDMA system as illustrated in FIG. 3. The input data enter on line 302 and are converted from serial to parallel in unit 310. We have assumed a rather simple "serial to parallel split" transmit multiplexing, in order to make our receiver solutions general enough for all possible MIMO transmit multiplexing methods. The modulated symbol streams are split in units 310-1 to 310-M at the transmitter into M sub-streams before being transmitted across the M transmit antennas 315.

Input antennas 325 pick up the signals that are detected by detectors 330-1 and processed by unit 350.

Figure 4:
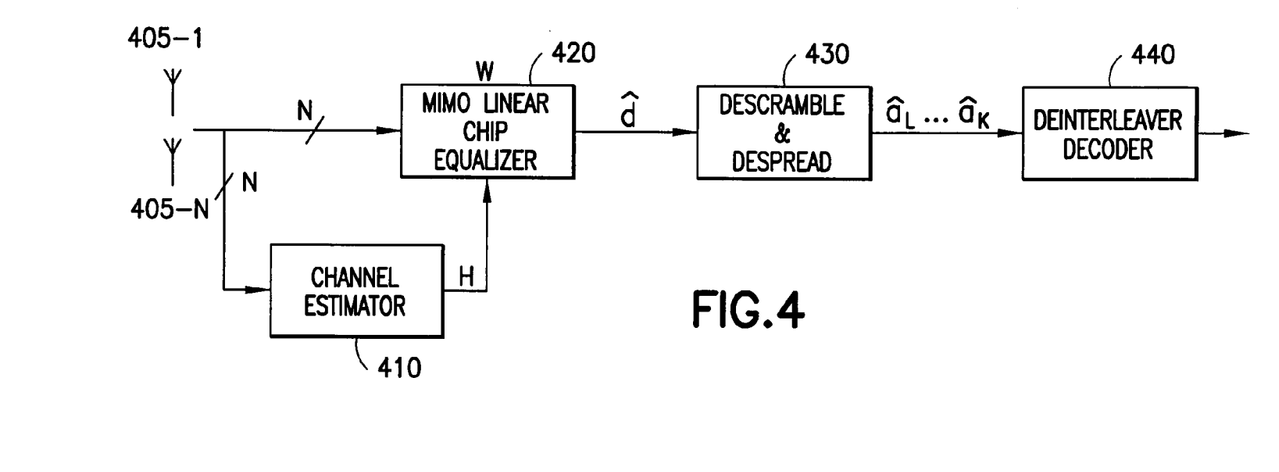
FIG. 4 shows a counterpart figure to FIG. 1 for the MIMO case.
Figure 5:
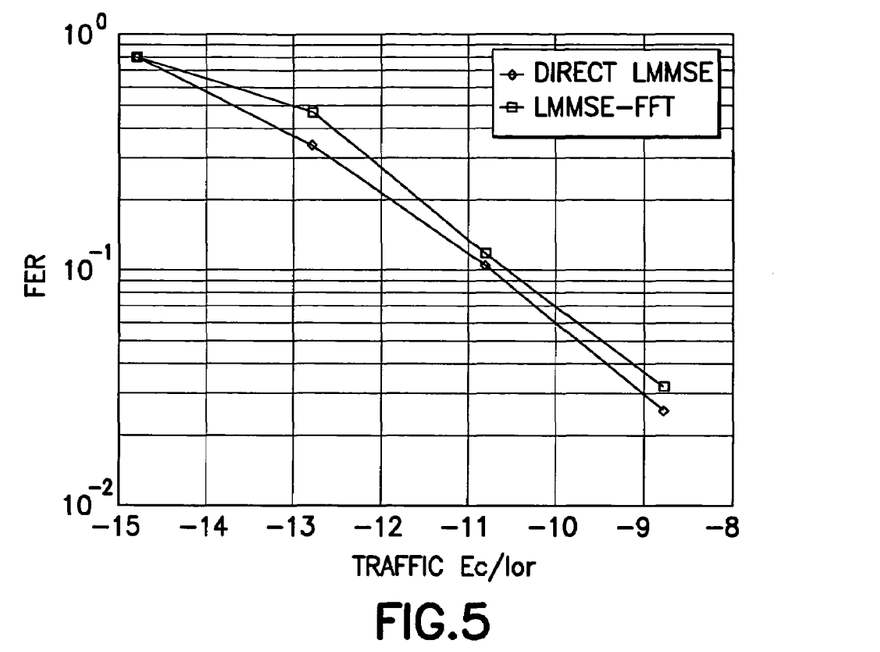
FIG. 5 shows a comparison of an exact solution with a solution according to the invention for a QPSK example.
Figure 6:
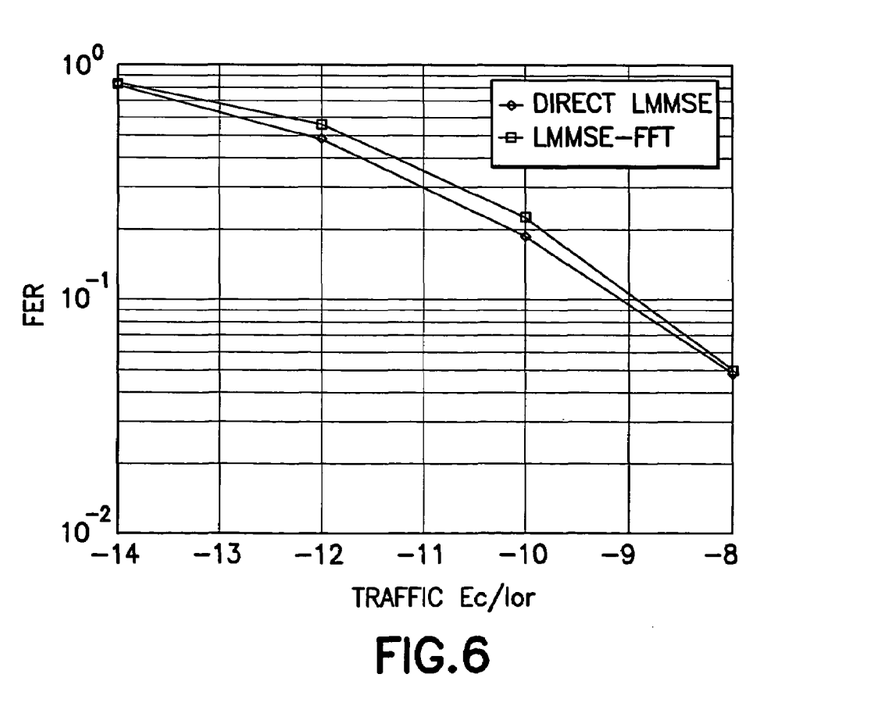
FIG. 6 shows a comparison of an exact solution with a solution according to the invention for a 16QAM example.

As shown in FIG. 4, the signal model at the $m_{th}$ transmit antenna is given as follows, assuming K active Walsh codes in the system:

$$d_m(i) = c(i) \sum_{k=1}^{K} \sum_m \alpha_k a_{k,m}(j) s_k(i - jG) \tag{1}$$

where i,j,m and k are chip, symbol, transmit antenna and spreading code indices. The base station scrambling code is denoted by c(i). Meanwhile, $\alpha_k$ stands for the power assigned to spreading code k (same for all antennas), $\alpha_{k,m}$ is the information symbol sequence for spreading code k at antenna m and $s_k$ is the $k_{th}$ spreading code. Note that in this model we have implicitly assumed that the same set of Walsh codes are used across all the transmit antennas.

The transmitted signals propagate through the MIMO multipath fading channel denoted by $H_0, \ldots, H_L$, where each matrix $H_l$ is of dimension $N\Delta \times M$, where $\Delta$ denotes number of samples per chip. The signal model at the receive antennas are thus given by the following equation, after stacking up the received samples across all the receive antennas for the $i^{th}$ chip interval.

$$y_i = \sum_{l=0}^{L} H_l d_{i-l} + n_i. \tag{2}$$

Note that $y_i = [y_{i,1}^T, \ldots, y_{i,N}^T]^T$ is of length $N\Delta$, and each small vector $y_{i,n}$ includes all the temporal samples within the $i^{th}$ chip interval. Meanwhile, L is the channel memory length, $d_{i-l} = [d_l(i-1), \ldots, d_M(i-1)]^T$ is the transmitted chip vector at time i-l, and $n_i$ is the $(N\Delta) \times 1$ dimensional white Gaussian noise vector with $n_i \sim N(0, \sigma^2 I)$. Note that $\sigma^2$ denotes noise variance and I is the identity matrix. Furthermore, in order to facilitate the discussion on the LMMSE receiver, we stack up a block of 2F+1 received vectors:

$$y_{i+F:i-F} = H d_{i+F:i-F-L} + n_{i+F:i-F} \tag{3}$$

where 2F+1 is the length of the LMMSE equalizing filter and $$y_{i+F:i-F} = [y_{i+F}^T, \ldots, y_{i-F}^T]^T, ((2F+1)N\Delta \times 1)$$
$$n_{i+F:i-F} = [n_{i+F}^T, \ldots, n_{i-F}^T]^T, ((2F+1)N\Delta \times 1)$$
$$d_{i+F:i-F-L} = [d_{i+F}^T, \ldots, d_{i-F-L}^T]^T, ((2F+L+1)M \times 1)$$
$$H = \begin{bmatrix} H_0 & \cdots & H_L & & \\ & \ddots & & \ddots & \\ & & H_0 & \cdots & H_L \end{bmatrix}, ((2F+1)N\Delta \times (2F+L+1)M)$$

where the dimensions of the matrices are given next to them. Note that to keep the notation more intuitive, we keep the subscripts at a "block" level. For instance, $y_{i+F:i-F}$ is the vector that contains blocks $y_{i+F}, \ldots, y_{i-F}$ where each block is a vector of size $N\Delta \times 1$.

The block diagram of the MIMO receiver with chip-level equalizer is shown in FIG. 4. The signals are received on antennas 405-1 through 405-N. Channel estimator 410 proceeds analogously to estimator 110 in FIG. 1 and estimates the parameters for the multiple channels. The chip-level equalizer 420 processes the raw signals in the light of input from the estimator after which, the orthogonality of the Walsh code is partially re-installed. Descrambler 430 detects the desired symbols from each transmit antenna which correlates to the desired spreading code. Note the descrambling process is also included in the code correlator. 430 Lastly, unit 440 performs the functions of deinterleaving and decoding.

All of these blocks operate on the N input signals from the N receive antennas. For example, the single lines in the diagram represent a set of lines that carry the signals in parallel.

Defining an error vector of $z = d_i - W^H y_{i+F:i-F}$ and an error covariance matrix $R_{zz} = E[zz^H]$, the MIMO LMMSE chip-level equalizer W is the solution of the following problem:

$$W^{opt} = \underset{W}{\operatorname{argmin}} \operatorname{Trace}(R_{zz}) = \underset{W}{\operatorname{argmin}} E \| d_i - W^H y_{i+F:i-F} \|^2, \tag{6}$$

whose optimal solution is given by:

$$W^{opt} = \sigma_d^2 R^{-1} H_{::i}. \tag{7}$$

where $R = E[y_{i+F:i-F} y_{i+F:i-F}^H]$ is the correlation matrix of the received signal, $\sigma_d^2$ is the transmitted chip power. Meanwhile, although H is fixed for a given channel realization and is not a function of symbol index i, here we use the notation $H_{i+F:i+1}$, $H_{i:i}$ and $H_{i-1:i-F-L}$ to represent the sub-matrices of H that are associated with $d_{i+F:i+1}$, $d_i$ and $d_{i-1:i-F-L}$ in the expansion of the matrix-vector product:

$$Hd_{i+F:i-F} \triangleq [H_{i+F:i+1} \quad H_{i:i} \quad H_{i-1:i-F-L}] \begin{bmatrix} d_{i+F:i+1} \\ d_i \\ d_{i-1:i-F-L} \end{bmatrix} \quad (10)$$

$$= H_{i+F:i+1}d_{i+F:i+1} + H_{i:i}d_i + H_{i-1:i-F-L}d_{i-1:i-F-L}.$$

The MIMO LMMSE solution involves the inversion of the correlation matrix of received signal R, which has a complexity of $O((L_F N\Delta)^3)$ where $L_F = (2F+1)$ is the temporal length of the filter. This complexity grows rapidly as the filter length increases, rendering the direct LMMSE method impractical, especially for fast-fading channel situations that require frequent filter update. To reduce the complexity of the LMMSE algorithm, an FFT based method was proposed in the parent case to avoid the direct matrix inversion in the SISO/SIMO LMMSE equalization. We show here that this FFT-based low complexity approach can be extended to our MIMO system of interest, and name the overall algorithm MIMO LMMSE-FFT.

We start by stating that for the quasi-stationary received signal of interest, the correlation matrix assumes the following block Toeplitz structure:

$$R = \begin{bmatrix} E_0 & \cdots & E_L^H & & 0 \\ \vdots & \ddots & & \ddots & \\ E_L & & \ddots & & E_L^H \\ & \ddots & & \ddots & \vdots \\ 0 & & E_L & \cdots & E_0 \end{bmatrix} \quad (11)$$

where in case of white noise, each $E_l$ is a small $N\Delta \times N\Delta$ matrix given by $$E_l = \sigma_d^2 \sum_{i=0}^{L} H_i H_{i-l}^H + \delta_l \sigma_n^2 I, \quad l = 0, \ldots, L$$

We are again interested in solving $W = \sigma_d^2 R^{-1} H_{i:i}$. Note that R is a $(L_F N\Delta) \times (L_F N\Delta)$ matrix. Although the direct inversion of such a large matrix is difficult, we show that with the circulant approximation and help of FFT operations, we are able to reduce this complex problem of inverting an $(L_F N\Delta) \times (L_F N\Delta)$ matrix into a much simpler problem of inverting $L_F$ small matrices of size $N\Delta \times N\Delta$.

Following a procedure similar to that for the SISO case, we can approximate the block Toeplitz matrix R by a block circulant matrix S. Furthermore, in order to invert S, we define cyclic shift matrix P of size $L_F \times L_F$:

$$P = \begin{bmatrix} 0 & 1 \\ I & 0 \end{bmatrix}. \quad (12)$$

Where I is the identity matrix. With this definition, it can be shown that S admits the following polynomial representation:

$$S = I \otimes E_0 + P \otimes E_1 + \ldots + P^{L_F - 1} \otimes E_{L_F - 1}. \quad (13)$$

Note that $\otimes$ denotes Kronecker product and $E_0, \ldots, E_{L_F-1}$ form the first "block" column in matrix S. Since P is a circulant matrix, it is well-known that P admits the following form of diagonalization:

$$P = D^H U D \quad (14)$$

where D is the DFT matrix and U is diagonal. Furthermore, for this special case it can be shown that $U = \text{diag}(1, U_{L_F}^{-1}, \ldots, U_{L_F}^{-(L_F-1)})$ with $U_{L_F} = e^{j(2\pi/L_F)}$. Substituting (14) into (13) we get:

$$S = \sum_{i=0}^{L_F-1} (D^H U D)^i \otimes E_i \quad (15)$$

$$= \sum_{i=0}^{L_F-1} (D^H U^i D) \otimes E_i$$

$$= (D^H \otimes I)(\sum_{i=0}^{L_F-1} U^i \otimes E_i)(D \otimes I).$$

Note that we have used the identity $(A \otimes B)(D \otimes G) = (AD) \otimes (BG)$. In (15), $D \otimes I$ and $D^H \otimes I$ define dimension-wise DFT and IDFT, respectively, meaning the DFT or IDFT is applied on each of the M diversity dimensions. On the other hand, $\Sigma_{i=0}^{L_F-1} U^i \otimes E_i$ is a block diagonal matrix whose diagonal blocks are the element-wise DFT of the array of matrices $E_0, \ldots, E_{L_F-1}$. Or mathematically, $$F \equiv \sum_{i=0}^{L_F-1} U^i \otimes E_i = \begin{bmatrix} F_0 & & 0 \\ & \ddots & \\ 0 & & F_{L_F-1} \end{bmatrix} \quad (16)$$

where $F_k (k=0, \ldots, L_F-1)$ is a $N\Delta \times N\Delta$ matrix defined by:

$$F_k = \sum_{i=0}^{L_F-1} U^{-ik} \otimes E_i, \quad k = 0, \ldots, L_F - 1. \quad (17)$$

Finally, the inverse of S is given by:

$$S^{-1} = (D^H \otimes I) F^{-1} (D \otimes I) \quad (18)$$

with the help of the identity $(N \otimes M)^{-1} = (N^{-1} \otimes M^{-1})$. Note in this case, the inversion of F boils down to the inversion of $L_F$ small $N\Delta \times N\Delta$ matrices since it is block diagonal. Finally, the optimal filter matrix $W^{opt}$ is given by $$W^{opt} = \sigma_d^2 R^{-1} H_{i:i} \quad (19)$$
$$\approx \sigma_d^2 S^{-1} H_{i:i}$$
$$= \sigma_d^2 (D^H \otimes I) F^{-1} (D \otimes I) H_{i:i}.$$

Figure 7:
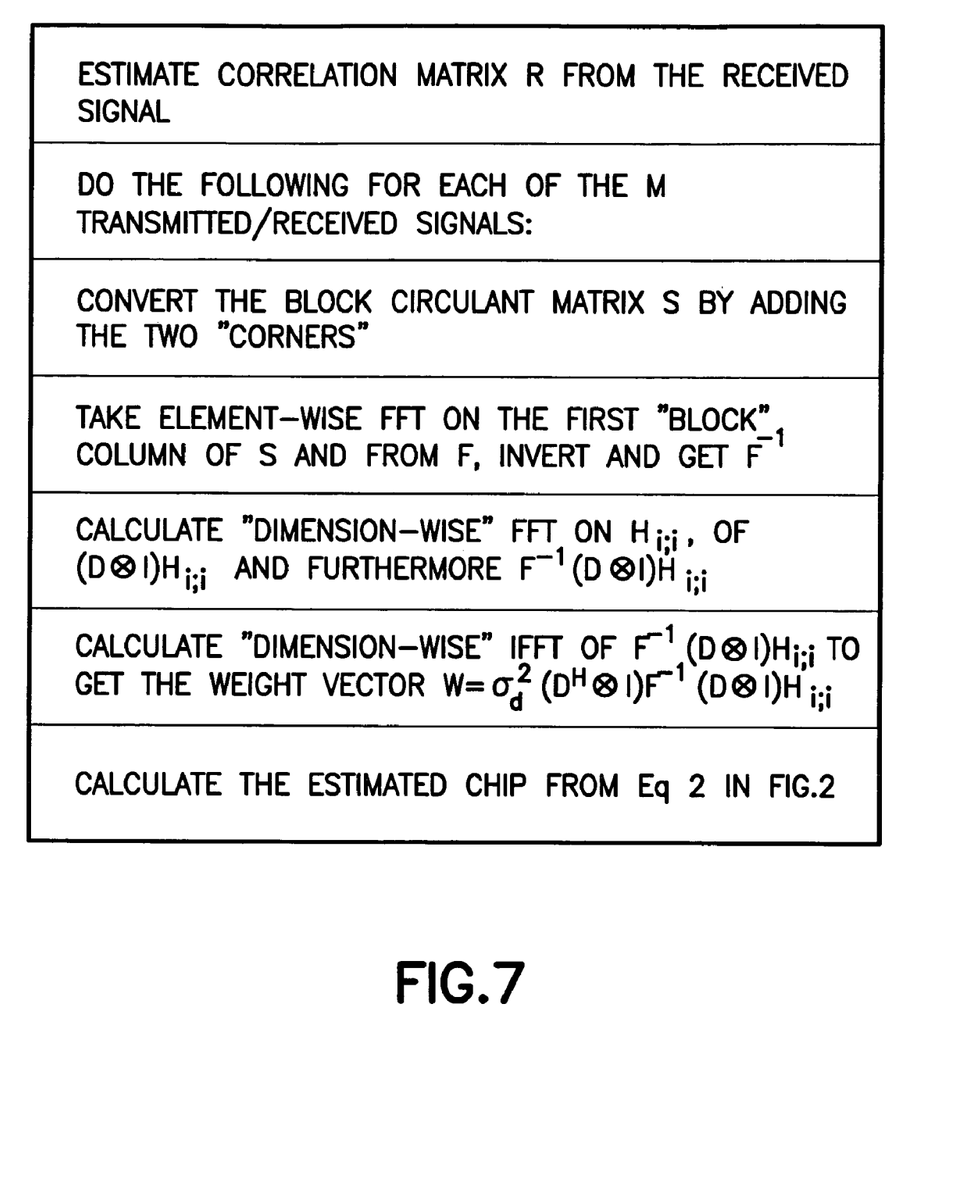
FIG. 7 shows a flow chart of the processing steps according to the invention.

The overall filter design algorithm for the multi-channel system may be summarized in FIG. 7 as:
Estimate correlation matrix R from the received signal.
Convert to the block circulant matrix S by adding the two "corners".

Take element-wise FFT on the first "block" column of S and form F, invert and get $F^{-1}$.

Calculate "dimension-wise" FFT of $H_{i:i}$, or $(D \otimes I)H_{i:i}$ and furthermore $F^{-1}(D \otimes I)H_{i:i}$.

Finally, calculate "dimension-wise" IFFT of $F^{-1}(D \otimes I)H_{i:i}$ to get the weight vector $W = \sigma_d^2 (D^H \otimes I) F^{-1} (D \otimes I) H_{i:i}$.

The algorithm stated above involves one "dimension-wise" FFT and IFFT on a vector of size $N\Delta L_F \times 1$ (which is equivalent to $N\Delta$ FFT/IFFTs of length $L_F$), one "element-wise" FFT on matrix of size $N\Delta \times N\Delta$ (which is equivalent to $(N\Delta)^2$ FFTs of length $L_F$), and $L_F$ matrix inversions of size $N\Delta \times N\Delta$. The complexity of this algorithm is $$O\left(L_F(N\Delta)^3 + \frac{(N\Delta)^2 + 2(N\Delta)}{2} L_F \log_2 L_F\right),$$

compared with the much higher complexity of $O((N\Delta L_F)^3)$ of a direct matrix inversion of R.

|  | Parameter Name | |
| --- | --- | --- |
|  | QPSK Case | 16 QAM Case |
| System | CDMA | CDMA 1X/EVDV |
| Spreading Length | 32 | 32 |
| Channel Profile | Vehicular A | Vehicular A |
| Mobile Speed | 50 km/hr | 50 km/hr |
| Filter Length | 32 | 32 |
| Number of Tx/Rx Antennas | 2/2 | 2/2 |
| Modulation Format | QPSK | 16 QAM |
| Information Data Rate | 312 kbps | 163.2 kbps |
| Turbo Code Rate | 0.6771 | 0.5313 |
| Geometry | 6 | 10 |
| Number of Walsh Codes Assigned to the user | 3 | 1 |
| Total Number of Walsh Codes in the System | 25 | 25 |

Simulation of MIMO Results

Although the invention has been described with respect to a limited number of embodiments, those skilled in the art will appreciate that other embodiments may be constructed within the spirit and scope of the following claims.

We claim:

1. A method of receiving a MIMO CDMA signal comprising the steps of:
   receiving on a set of (M) input antennas, where M is at least one, a spread spectrum received signal containing a target signal and applying a channel equalization process on said M received signals to generate M equalized signals, wherein the step of applying an equalization process comprises the steps of:
   estimating the channel correlation matrix R of the received signal;
   converting R to the block circulant matrix S;
   taking the Fourier Transform (FT) of the first column of S and forming a diagonal matrix F;
   taking the FT of the M channel impulse vectors and multiplying by the inverse of Λ matrix F to generate the frequency domain filter taps; and
   taking the inverse FT of the frequency domain filter taps to generate filter weights applied to said M received signals to generate said M equalized signals.

2. A method according to claim 1, in which said FT is a DFT.

3. A method according to claim 1, in which said FT is a FFT (Fast Fourier Transform).

4. A method according to claim 1, further including a step of adding a constant to the diagonal elements of the block circulant matrix.

5. A method according to claim 2, further including a step of adding a constant to the diagonal elements of the block circulant matrix.

6. A method according to claim 3, further including a step of adding a constant to the diagonal elements of the block circulant matrix.

7. A method according to claim 1, in which said each of the M received signals is in the form of a vector of $N\Delta L_F \Delta$ elements, where N is the number of receive antennas and $\Delta$ is the number of samples per chip and further including a step of performing calculations in the frequency domain with a corresponding vector of $2N\Delta L_F \Delta$ elements, after which the transformed vector in the time domain is truncated by removing the first and last $N\Delta L_F/2$ elements.

8. A method according to claim 2, in which said each of the M received signals is in the form of a vector of $N\Delta L_F \Delta$ elements, where N is the number of receive antennas and $\Delta$ is the number of samples per chip and further including a step of performing calculations in the frequency domain with a corresponding vector of $2N\Delta L_F \Delta$ elements, after which the transformed vector in the time domain is truncated by removing the first and last $N\Delta L_F/2$ elements.

9. A method according to claim 3, in which said each of the M received signals is in the form of a vector of $N\Delta L_F \Delta$ elements, where N is the number of receive antennas and $\Delta$ is the number of samples per chip and further including a step of performing calculations in the frequency domain with a corresponding vector of $2N\Delta L_F \Delta$ elements, after which the transformed vector in the time domain is truncated by removing the first and last $N\Delta L_F/2$ elements.

10. A method according to claim 4, in which said each of the M received signals is in the form of a vector of $N\Delta L_F \Delta$ elements, where N is the number of receive antennas and $\Delta$ is the number of samples per chip and further including a step of performing calculations in the frequency domain with a corresponding vector of $2N\Delta L_F \Delta$ elements, after which the transformed vector in the time domain is truncated by removing the first and last $N\Delta L_F/2$ elements.

11. A method according to claim 5, in which said each of the M received signals is in the form of a vector of $N\Delta L_F \Delta$ elements, where N is the number of receive antennas and $\Delta$ is the number of samples per chip and further including a step of performing calculations in the frequency domain with a corresponding vector of $2N\Delta L_F \Delta$ elements, after which the transformed vector in the time domain is truncated by removing the first and last $N\Delta L_F/2$ elements.

12. A method according to claim 6, in which said each of the M received signals is in the form of a vector of $N\Delta L_F \Delta$ elements, where N is the number of receive antennas and $\Delta$ is the number of samples per chip and further including a step of performing calculations in the frequency domain with a corresponding vector of $2N\Delta L_F \Delta$ elements, after which the transformed vector in the time domain is truncated by removing the first and last $N\Delta L_F/2$ elements.

13. A method of receiving a MIMO CDMA signal in a multi-channel apparatus responsive to M channels comprising the steps of:
   receiving on a set of M input antennas, where M is at least one, a spread spectrum signal containing a target signal and applying a channel equalization process on said M received signals to generate an equalized signal;

performing a code correlation operation on said equalized signal to generate an output signal representative of said target signal; and processing said output signal, wherein said step of applying an equalization process comprises the steps of:

estimating the channel correlation matrix R of the received signal, where R has the form of a banded block Toeplitz matrix comprising a set of sub-matrices of dimension M×M;

converting R to a block circulant matrix S having a polynomial representation of Kronecker products;

taking the element-wise Fourier transform FT of the first block column of S and forming a block diagonal matrix F;

taking the dimension-wise FT of the channel impulse vector and multiplying by the inverse of F to generate the frequency domain filter taps; and taking the inverse FT of the frequency domain filter taps to generate filter weights applied to said M received signals to generate said M equalized signals.

14. A method according to claim 13, in which said FT is a DFT.

15. A method according to claim 13, in which said FT is a FFT.

16. A method according to claim 13, further including a step of adding a constant to the diagonal elements of the block circulant matrix.

17. A method according to claim 14, further including a step of adding a constant to the diagonal elements of the block circulant matrix.

18. A method according to claim 13, further including a step of adding a constant to the diagonal elements of the block circulant matrix.

19. A method according to claim 13, in which said each of the M received signals is in the form of a vector of $N\Delta L_F \Delta$ elements, where N is the number of receive antennas and $\Delta$ is the number of samples per chip and further including a step of performing calculations in the frequency domain with a corresponding vector of $2N\Delta L_F \Delta$ elements, after which the transformed vector in the time domain is truncated by removing the first and last $N\Delta L_F/2$ elements.

20. A method according to claim 14, in which said each of the M received signals is in the form of a vector of $N\Delta L_F \Delta$ elements, where N is the number of receive antennas and $\Delta$ is the number of samples per chip and further including a step of performing calculations in the frequency domain with a corresponding vector of $2N\Delta L_F \Delta$ elements, after which the transformed vector in the time domain is truncated by removing the first and last $N\Delta L_F/2$ elements.

21. A method according to claim 16, in which said each of the M received signals is in the form of a vector of $N\Delta L_F \Delta$ elements, where N is the number of receive antennas and $\Delta$ is the number of samples per chip and further including a step of performing calculations in the frequency domain with a corresponding vector of $2N\Delta L_F \Delta$ elements, after which the transformed vector in the time domain is truncated by removing the first and last $N\Delta L_F/2$ elements.

22. A method according to claim 17, in which said each of the M received signals is in the form of a vector of $N\Delta L_F \Delta$ elements, where N is the number of receive antennas and $\Delta$ is the number of samples per chip and further including a step of performing calculations in the frequency domain with a corresponding vector of $2N\Delta L_F \Delta$ elements, after which the transformed vector in the time domain is truncated by removing the first and last $N\Delta L_F/2$ elements.

23. A method according to claim 18, in which said each of the M received signals is in the form of a vector of $N\Delta L_F \Delta$ elements, where N is the number of receive antennas and $\Delta$ is the number of samples per chip and further including a step of performing calculations in the frequency domain with a corresponding vector of $2N\Delta L_F \Delta$ elements, after which the transformed vector in the time domain is truncated by removing the first and last $N\Delta L_F/2$ elements.

24. A method according to claim 19, in which said each of the M received signals is in the form of a vector of $N\Delta L_F \Delta$ elements, where N is the number of receive antennas and $\Delta$ is the number of samples per chip and further including a step of performing calculations in the frequency domain with a corresponding vector of $2N\Delta L_F \Delta$ elements, after which the transformed vector in the time domain is truncated by removing the first and last $N\Delta L_F/2$ elements.

25. A system for receiving a MIMO CDMA signal comprising:

means for receiving on a set of M input antennas, where M is at least one, a spread spectrum signal containing a target signal and applying a channel equalization process on said M received signals to generate M equalized signals;

means for performing a code correlation operation on said M equalized signals to generate an output signal representative of said target signal; and means for processing said output signal, wherein said means for applying an equalization process comprises means for:

estimating the channel correlation matrix R of the received signal;

converting R to the block circulant matrix S;

taking the Fourier Transform (FT) of the first column of S and forming a diagonal matrix F;

taking the FT of the channel impulse vector and multiplying by the inverse of F to generate the frequency domain filter taps; and taking the inverse FT of the frequency domain filter taps to generate filter weights applied to said M received signals to generate said M equalized signals.

26. A system according to claim 25, further including means for performing a step of adding a constant to the diagonal elements of the block circulant matrix.

27. A system according to claim 26, in which said each of the M received signals is in the form of a vector of $N\Delta L_F \Delta$ elements, where N is the number of receive antennas and $\Delta$ is the number of samples per chip and further including a step of performing calculations in the frequency domain with a corresponding vector of $2N\Delta L_F \Delta$ elements, after which the transformed vector in the time domain is truncated by removing the first and last $N\Delta L_F/2$ elements.

28. A system for receiving a MIMO CDMA signal having M transmitted signals in a multi-channel apparatus responsive to M channels comprising:

means for receiving on a set of M input antennas, where M is at least one, a spread spectrum signal containing a target signal and applying a channel equalization process on said M transmitted and received signals to generate M equalized signals;

means for performing a code correlation operation on said equalized signal to generate an output signal representative of said target signal; and means for processing said output signal, wherein said means for applying an equalization process comprises means for:

estimating the channel correlation matrix R of the received signal, where R has the form of a banded block Toeplitz matrix comprising a set of sub-matrices of dimension M×M;

converting R to the block circulant matrix S having a polynomial representation of Kronecker products;

taking the element-wise Fourier transform FT of the first block column of S and forming a block diagonal matrix F;

taking the dimension-wise FT of the M channel impulse vectors and multiplying by the inverse of F to generate the frequency domain filter taps; and taking the inverse FT of the frequency domain filter taps to generate filter weights applied to said M received signals to generate said M equalized signals.

29. A system according to claim 28, further including means for adding a constant to the diagonal elements of the block circulant matrix.

30. A system according to claim 29, in which said each of the M received signals is in the form of a vector of $N\Delta L_F\Delta$ elements, where N is the number of receive antennas and $\Delta$ is the number of samples per chip and further including a step of performing calculations in the frequency domain with a corresponding vector of $2N\Delta L_F\Delta$ elements, after which the transformed vector in the time domain is truncated by removing the first and last $N\Delta L_F/2$ elements.

31. A program of machine-readable instructions, tangibly embodied on a program storage medium and executable by a computer processor, to perform actions directed toward applying a channel equalization process on M spread spectrum signals received at M antennas to generate M equalized signals the actions comprising:

estimating the channel correlation matrix R of the received signal;

for each of the M signals, converting R to the block circulant matrix S;

taking the FT of the first column of S and forming a diagonal matrix $\Lambda$;

taking the FT of the channel impulse vector and multiplying by the inverse of $\Lambda$ to generate the frequency domain filter taps; and taking the inverse FT of the frequency domain filter taps to generate filter weights applied to said M transmitted signals to generate said M equalized signals.

32. A program according to claim 31, wherein the actions further include adding a constant to the diagonal elements of the block circulant matrix.

33. A program according to claim 29, in which said each of the M spread spectrum signals is in the form of a vector of $N\Delta L_F\Delta$ elements, where N is the number of receive antennas and $\Delta$ is the number of samples per chip and further including a step of performing calculations in the frequency domain with a corresponding vector of $2N\Delta L_F\Delta$ elements, after which the transformed vector in the time domain is truncated by removing the first and last $N\Delta L_F/2$ elements.

34. An article of manufacture for receiving a CDMA signal comprising:

M receive antennas for receiving a spread spectrum signal containing a target signal;

a computer and a computer readable medium for applying a channel equalization process on said received signal to generate an equalized signal;

wherein the equalization process comprises:

estimating the channel correlation matrix R of the received signal, where R has the form of a banded block Toeplitz matrix comprising a set of sub-matrices of dimension M×M;

for each target signal received at an M antenna, converting R to the block circulant matrix S having a polynomial representation of Kronecker products;

taking the element-wise FT of the first block column of S and forming a block diagonal matrix F;

taking the dimension-wise FT of the channel impulse vector and multiplying by the inverted block diagonal matrix $F^{-1}$ to generate the frequency domain filter taps; and taking the inverse FT of the frequency domain filter taps to generate filter weights applied to said received signal to generate said equalized signal.

35. An article of manufacture according to claim 34, wherein the equalization process further comprises adding a constant to the diagonal elements of the block circulant matrix.

36. An article of manufacture according to claim 35, in which said received signal is in the form of a vector of $L_F$ elements wherein the equalization process further comprises performing calculations in the frequency domain with a corresponding vector of $2L_F$ elements, after which the transformed vector in the time domain is truncated by removing the first and last ($L_F/2$) elements.

* * * * *